US010218664B1

United States Patent
Maczka et al.

(10) Patent No.: US 10,218,664 B1
(45) Date of Patent: Feb. 26, 2019

(54) RECURRENT INVITATION LOOP

(71) Applicant: LinkedIn Corporation, Mountain View, CA (US)

(72) Inventors: Michael Maczka, San Jose, CA (US); Joonhyung Lim, San Jose, CA (US); Brad C. Ciraulo, Redwood City, CA (US); Damien Albert Louis Coullon, Mountain View, CA (US); Yang Zhou, San Jose, CA (US); Han-Tien Chang, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 395 days.

(21) Appl. No.: 15/218,731

(22) Filed: Jul. 25, 2016

(51) Int. Cl.
*H04L 29/08* (2006.01)
*G06F 15/16* (2006.01)
*H04L 12/58* (2006.01)
*H04W 4/14* (2009.01)

(52) U.S. Cl.
CPC .............. *H04L 51/32* (2013.01); *H04L 51/04* (2013.01); *H04L 67/02* (2013.01); *H04W 4/14* (2013.01)

(58) Field of Classification Search
CPC .............. H04L 12/1827; H04L 12/1831; H04L 65/1006; H04L 65/1069; H04W 40/125; H04W 72/0453

USPC ......................................................... 709/206
See application file for complete search history.

(56) References Cited

U.S. PATENT DOCUMENTS

| 2006/0168006 A1* | 7/2006 | Shannon ............ G06Q 10/107 709/206 |
| 2008/0215348 A1* | 9/2008 | Guldimann ........... G06Q 30/02 705/1.1 |

* cited by examiner

*Primary Examiner* — Tu T Nguyen
(74) *Attorney, Agent, or Firm* — Park, Vaughan, Fleming & Dowler LLP (57) ABSTRACT

A system, apparatus, and methods are provided for queuing and resending organically generated invitations by members of a user community. During operation, the system sends a first invitation organically generated by a first member of the community to an invitee. For one or more time periods after the invitee receives the first invitation, the system performs the following steps. First, the system queues all invitations organically generated by members of the community and addressed to the invitee within the time period. Next, if the invitee is not a member of the user community when the time period expires, (1) if the queue is not empty, the system de-queues and sends at least one queued invitation to the invitee; and (2) if the queue is empty, the system resends to the invitee at least one of the invitations that was previously received by the invitee.

23 Claims, 4 Drawing Sheets

RECURRENT INVITATION LOOP

BACKGROUND

Field

The disclosed embodiments relate to inviting individuals to join an online user community. More particularly, a system, apparatus, and methods are provided for utilizing invitations organically generated by members of a user community.

Related Art

As a service to users of an online user community, the user community may enable members to send invitations to individuals who are not currently members of the user community. For example, a member may send an invitation in the form of a Short Message Service (SMS) message to a contact in the member's address book. If the invitee accepts the invitation, the invitee joins the user community as a new member.

In some cases however, the invitee may miss the invitation or forget to respond to the invitation, which could deprive the community of a new member. While the member could resend the invitation to the invitee, this would rely on the member to perform one or more additional actions.

Hence, what is needed is a system that increases the chance of an invitee responding to an invitation without the above-described problems.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, flash storage, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The disclosed embodiments provide a method, apparatus, and system for queuing and resending invitations organically generated by members of an online user community to facilitate invitation acceptance behavior by non-members invitees towards the user community.

During operation, a given member of the user community organically generates an initial invitation that is addressed to a non-member invitee (e.g., addressed to an email address of the invitee or directed to a phone number of the invitee) to invite the invitee to join the user community. A notifications controller sends the initial invitation to the non-member. For an initial capping period (i.e., a cool off period) that follows the sending of the invitation, if one or more other members of the user community organically generates one or more subsequent invitations that are addressed to the non-member, the notifications controller may queue the one or more subsequent invitations rather than send them, to avoid overwhelming the invitee.

At the end of the initial capping period, if the invitee has not joined the user community, one of the following actions is performed. If one or more organically generated invitations are queued, the notifications controller may dequeue and send at least one invitation to the invitee. If the queue is empty, the notifications controller may resend the initial invitation to the invitee as a reminder.

The aforementioned actions may be repeated during one or more additional capping periods that follow the initial capping period, thereby forming a recurrent invitation loop. During each capping period, organically generated invitations addressed to the invitee are queued. At the end of each capping period, depending upon the contents of the queue, (1) one or more queued invitation are sent to the invitee or (2) a previously sent invitation is sent as a reminder to the invitee.

By (1) limiting the number of invitations that are sent to an invitee during a particular time period, (2) queuing invitations that exceed this limit, (3) sending the queued invitations at a later point in time, and (4) occasionally resending organically generated invitations as reminders when there are no more invitations to send, invitations that are organically generated by its members are used efficiently and effectively, thereby increasing the chance that the invitee sees and/or responds to an invitation without being overwhelmed.

Figure 1:
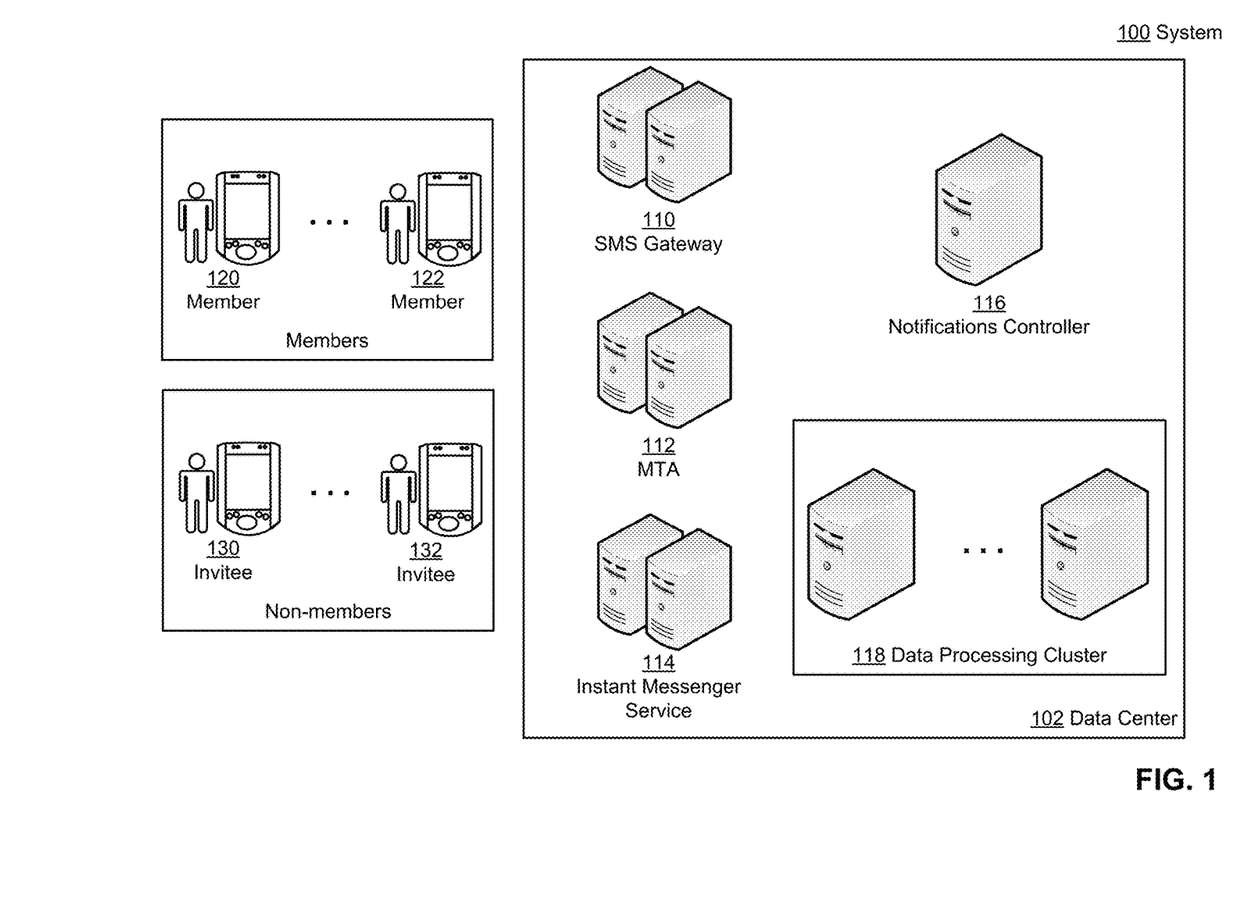
FIG. 1 shows a schematic of a system in accordance with the disclosed embodiments.

FIG. 1 shows a schematic of a system in accordance with the disclosed embodiments. System 100 of FIG. 1 corresponds to one or more data centers associated with one or more software application and includes different components in different embodiments. In the illustrated embodiments, the system includes members 120-122, invitees 130-132, and data center 102, which includes Short Message Service (SMS) gateway 110, Mail Transfer Agent (MTA) 112, instant messenger service 114, notifications controller 116, and data processing cluster 118.

Members 120-122 may each correspond to an individual who has created a user account at the online user community and uses a personal computing device (e.g., a smartphone, a tablet, and/or a laptop) to login to the user account. By logging into his or her user account, a member may interact with other members of the user community and/or access resources through one or more webpages and/or online services provided by the user community. The provision of these webpages and/or online services may be handled by the user community's infrastructure, which may include data center 102 and other data centers. A data center may house one or more machines (i.e., servers, computers) for serving the webpages and/or online services.

Notifications controller 116 may correspond to one or more servers that provide an email and notifications platform for coordinating the sending of emails, SMS messages, push notifications, instant messages, and/or other types of digital correspondence from members within the user community, and the user community itself, to other members within the user community and/or non-member individuals. To improve the user experience for all individuals, the notifications controller may manage the type and volume of notifications sent to each individual based on the individual's preferences and/or historical behavior. Thus, for a particular individual, the notifications controller may determine: one or more times during which the individual prefers to receive notifications, one or more communication channels (e.g., email, push notification, SMS) preferred by the individual, and/or a rate of sending notifications to the individual that does not overwhelm the individual. In some embodiments, notifications controller 116 may correspond to the Air Traffic Controller (ATC) platform of LinkedIn Corporation.

To send notifications across various communication channels, notifications controller 116 may instruct SMS gateway 110, MTA 112, instant messenger service 114, and/or other servers when to send notifications and who to send notifications to. SMS gateway 110 may correspond to one or more servers that execute one or more software programs for handling the transmission and/or receipt of SMS messages (e.g., Flock). MTA 112 may correspond to one or more servers that execute one or more software programs for handling the transmission and/or receipt of emails (e.g., sendmail, Exim). Instant messenger service 114 may correspond to one or more servers that execute one or more software programs for handling the transmission and/or receipt of instant messages (e.g., Messenger for LinkedIn, XMPP).

Some servers may be organized into one or more clusters of servers, such as data processing cluster 118. In general, a cluster of machines may share common properties. For instance, each of the machines in an application cluster may execute one or more instances of a software application. In particular, data processing (i.e., computational) cluster 118 supports the distributed processing of data, especially very large data sets (e.g., members within the user community, correspondences generated by the user community). In some embodiments, data processing cluster 118 may include a Hadoop cluster.

Jobs (e.g., Hadoop jobs) submitted to the data processing cluster are divided and/or partitioned into any number of tasks, which are distributed among the data nodes for processing. When executed, a job may spawn one or more mapper tasks that process (raw) data, and (oftentimes) a set of reducer tasks that process the output of the mapper tasks. Each task may be executed within a container that provides a virtualized environment (e.g., such as a JVM), in which instructions (e.g., high level code, bytecode, native machine code) contained in the job may execute. In many cases, notifications controller 116 may use information derived from jobs executed by data processing cluster 118.

Invitees 130-132 may each correspond to an individual who (1) has not joined the user community and (2) has received an invitation from one of members 120-122 to join the user community. In general, members may be able to send invitations to non-member contacts stored in their address books (i.e., contact list, group member list, and/or friend list) and/or to other non-member individuals by directly providing contact information upon request (e.g., by providing phone numbers, email addresses, and/or instant messaging aliases of the individuals). For example, member 120 may have invitee 130's phone number stored in the member's address book. At the user community's suggestion, the member may send an SMS message to the phone number, wherein the SMS message includes text that invites invitee 130 to join the user community.

Figure 2:
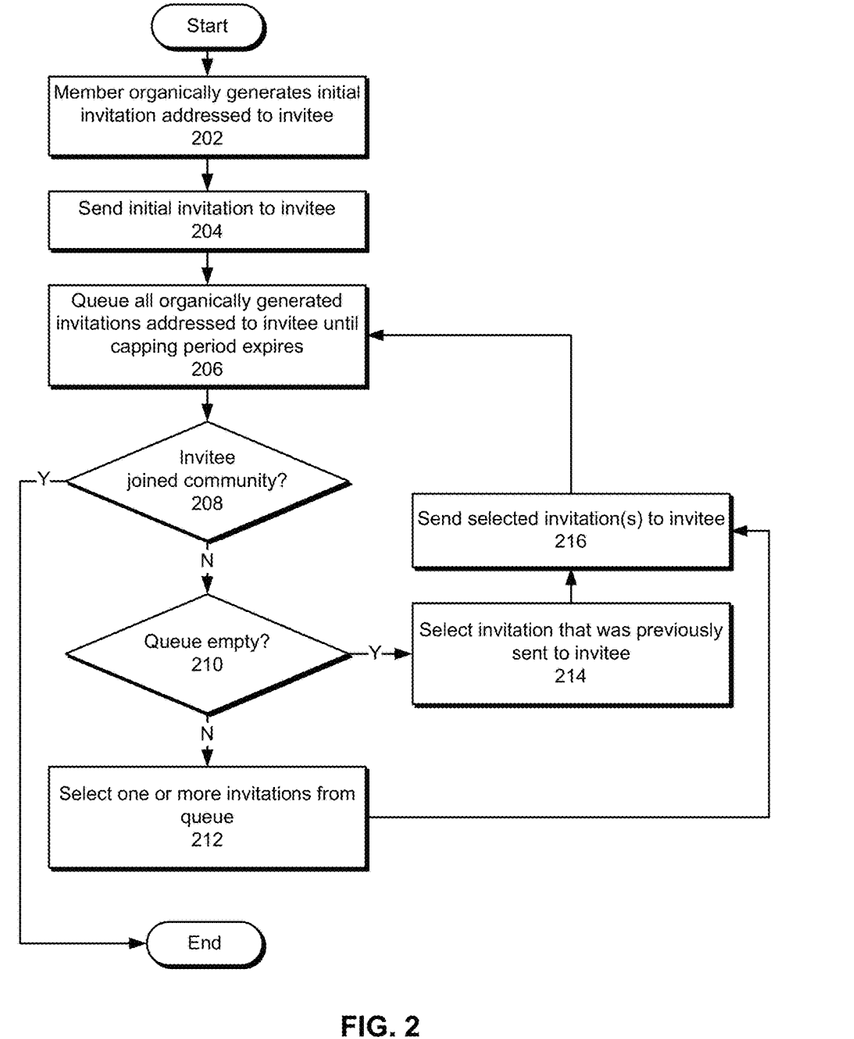
FIG. 2 shows a flowchart illustrating an exemplary process of using a recurrent invitation loop to facilitate invitation acceptance behavior in accordance with the disclosed embodiments.

FIG. 2 shows a flowchart illustrating an exemplary process of using a recurrent invitation loop to facilitate invitation acceptance behavior in accordance with the disclosed embodiments. In one or more embodiments, one or more of the steps may be omitted, repeated, and/or performed in a different order. Accordingly, the specific arrangement of steps shown in FIG. 2 should not be construed as limiting the scope of the embodiments.

Initially, a given member of the user community organically generates an initial invitation that is addressed to a non-member invitee (operation 202). The initial invitation may be generated in a variety of ways. For example, when the given member logs into the user community at a web browser or a client application, the user community may display, to the member, one or more splash pages that urge the member to invite one or more non-member individuals stored in the member's contacts (including the invitee). The splash pages may include a form element (e.g., a button) that triggers the generation of invitations when organically activated by the member. If the given member organically activates the form element (e.g., taps/clicks on the button), invitations (which include the initial invitation) are generated for the non-member individuals.

The notifications controller then sends the initial invitation to the invitee (operation 204). Generally, invitations organically generated by the given member may be forwarded to notifications controller 116, which evaluates one or more rules to determine when the invitations may be sent to their recipients. The notifications controller may consider (1) whether the recipient has received an invitation before, (2) a length of time since the recipient received an invitation, and/or (3) how many invitations the recipient has previously received. Because the initial invitation is the first invitation that is sent to the invitee, no capping period is imposed on the invitee at this point. Thus, the notifications controller allows the initial invitation to be sent to the invitee immediately.

If the invitation is configured to be sent as an SMS message, SMS gateway 110 may send the SMS message to a phone number that is associated with the invitee (which may cause the SMS message to appear at a messaging client executing on the invitee's mobile device). If the invitation is configured to be sent as an email, MTA 112 may send the email to an email address that is associated with the invitee (which may cause the email to appear at an email client executing on the invitee's mobile device). If the invitation is configured to be sent as an instant message, instant messenger (IM) service 114 may send the instant message to a handle that is associated with the invitee on the IM network (which may cause the instant message to appear at an IM client executing on the invitee's mobile device). It should be noted that various other digital channels may be used to communicate the invitation to the invitee and that these example channels should not be construed as limiting the scope of the embodiments.

At some point after the sending of the initial invitation, the invitee receives the initial invitation. Because the given member expended one or more organic actions to generate the invitation to the invitee (by responding to the splash screens), the initial invitation can be referred to as an organically generated invitation and the invitee can be said to have organically received the initial invitation. By accepting the invitation (e.g., by clicking on a link included within the invitation's text), the invitee can join the user community. However, the invitee may instead choose to ignore the invitation or postpone action regarding the invitation.

During an initial capping period that follows the sending of the initial invitation, the notifications controller may queue any additional organically generated invitations addressed to the invitee (operation 206). In some embodiments, the invitations are queued within a data structure (e.g., a list, a queue, a row within a database table) that is associated with the invitee. The initial capping period is imposed after the initial invitation is sent to the invitee to ensure that no more than one invitation is sent to the invitee between each capping period. For example, if the capping period is 28 days long, after receiving the initial invitation, notifications controller 116 prevents the sending of invitations to the invitee for 28 days.

During the initial capping period, if the notifications controller receives an invitation that is intended for the invitee, the notifications controller may queue the invitation. In some embodiments, the notifications controller may queue any invitation generated during the capping period, regardless of the source. Alternatively, if the notifications controller receives a second invitation from a member that already generated an invitation for the invitee, the notifications controller may drop the invitation, thereby ensuring that each queued invitation originates from a different member. As a result of the queuing, the invitee does not receive another invitation to join the user community until the end of the capping period.

When the initial capping period expires, if the invitee has not joined the user community (decision 208), notifications controller 116 may take one of the following actions depending on the number of invitations that are queued. If no invitations are queued (decision 210), the notifications controller may resend the initial invitation to the invitee (operation 214) as a reminder.

It should be noted that some members may object to the resending of their invitations without their consent. Thus, some embodiments may ask for a member's permission to allow the user community to automatically resend invitations, which were previously organically generated by the member, as reminders on the member's behalf. For example, when the member logs into the user community (e.g., via a web browser or a mobile/desktop application), the user community may display, to the member, one or more splash pages that request permission for the user community to automatically resend any invitation organically generated by the member at any point in the future. The splash pages may (1) display one or more of the member's contacts who have previously received an invitation from the member, but have not joined the user community, and (2) ask whether the member wants to remind the contacts. If the member agrees, the member grants the user community permission to automatically send reminders on behalf of the member at any point in the future. If the member does not agree, the user community will not automatically resend reminders on behalf of the member. In some embodiments, the splash pages may be displayed when the member logs into the user community for the first time after joining.

To generate a reminder, relevant information from the initial invitation (e.g., the member that generated the initial invitation) may be extracted from the initial invitation and reformatted. Alternatively, the initial invitation may be resent as is. Automatically resending the invitation may increase the chance that the invitee joins the user community without requiring the given member perform additional organic actions. In situations where the invitee missed the initial invitation and/or forgot to respond to the initial invitation, the reminder may give the invitee a second chance to respond.

If one or more invitations are queued (decision 210), the notifications controller may select one or more invitations from the queue to send to the invitee (operation 212). As explained previously, the notifications controller may have queued a number of invitations that were organically generated during the initial capping period. If only one invitation is queued, the notifications controller may dequeue and send the invitation to the invitee.

In some embodiments, if more than one invitation is queued, a batch invitation that includes multiple invitations may be generated and sent to the invitee. For example, if, at the expiration of the initial capping period, the queue is found to include invitations from a second member and a third member, a batch invitation that includes text stating that multiple members are inviting the invitee to join the user community may be generated, wherein the text includes both the names of the second and third members. The notifications controller may then send the batch invitation to the invitee. By seeing that multiple peers are inviting the invitee to join the user network, the invitee may become more likely to respond.

In some embodiments, if more than one invitation is queued, the invitation that is generated by the member with the strongest affinity to the invitee (out of all members associated with the queued invitations) may be selected, dequeued, and sent to the invitee. The selection of the invitation is discussed in further detail below with respect to FIG. 3.

Next, the notifications controller sends the selected invitations (e.g., a queued invitation, a batch invitation, or a reminder) to the invitee (operation 216). Afterward, a subsequent capping period is imposed (operation 206) on the invitee. In some embodiments, the subsequent capping period may be the same length as the initial one. Alternatively, the length of capping periods may be adjusted to improve the invitee's user experience. Each time a capping period passes without the invitee joining the user community, it becomes more probable that the user does not wish to join the user community and does not want the invitations. Thus, to avoid degrading the invitee's user experience, the user community may calculate the length of a capping period based on the probability that the invitee will accept the next invitation. In some embodiments, the user community may increase the length of each subsequent capping period. For example, if the initial capping period is 28 days long, the subsequent capping period may be 56 days long. The exemplary process may loop through multiple capping periods (i.e., loop over operations 206-216) until the invitee joins the user community. In some embodiments, the process may end after a threshold number of capping periods expire.

As shown in FIG. 2, a capping period of a particular length is imposed after an invitation (e.g., a queued invitation, a batch invitation, or a reminder) is sent to the invitee. Any invitation generated by a member of the user community during one of these capping periods is queued. At the end of each capping period where the invitee is still not a member of the user community, the user community sends another invitation (e.g., a queued invitation, a batch invitation, or a reminder) to the invitee, before the process loops again.

It should be noted that the automatic generation and/or sending of queued invitations and/or reminders may be performed by one or more components located within one or more data centers that support the user community (which may include data center 102). In particular, one or more data processing clusters, which may include data processing cluster 118, may periodically determine which invitees have had associated capping periods expire, which invitees have invitations addressed to them that are queued, and/or which members have consented to the sending of reminders. At scheduled points in time, the data processing clusters may (1) from these determinations, derive a list of invitations to be sent immediately and (2) forward the list to notifications controller 116. The notifications controller may proceed to send each of the invitations in the list through SMS gateway 110, MTA 112, instant messenger service 114, and/or other servers.

In some embodiments, the user community may alternate between multiple communication channels (e.g., SMS messages, emails, IM messages, and/or push notifications). For example, if the user community sends the initial invitation as an SMS message, the user community may send the subsequent invitation as an email. Thus, although only one invitation is sent for each capping period, the invitee may be contacted via multiple channels across a plurality of capping periods. This approach avoids sending too many invitations to the invitee while reducing the risk that the invitee misses all invitations because the invitee neglects a particular channel (e.g., fails to check emails, and/or blocked SMS messages). In embodiments where a contact may contain multiple addresses in a single channel (e.g., alternative email addresses, multiple phone numbers, and/or multiple IM handles), the user community could alternate between the multiple addresses and/or the multiple channels. For example, the user community could send the initial invitation as an email to a first email address of the invitee, a subsequent invitation to a phone number of the invitee, and another subsequent invitation to an alternative email address of the invitee.

Figure 3:
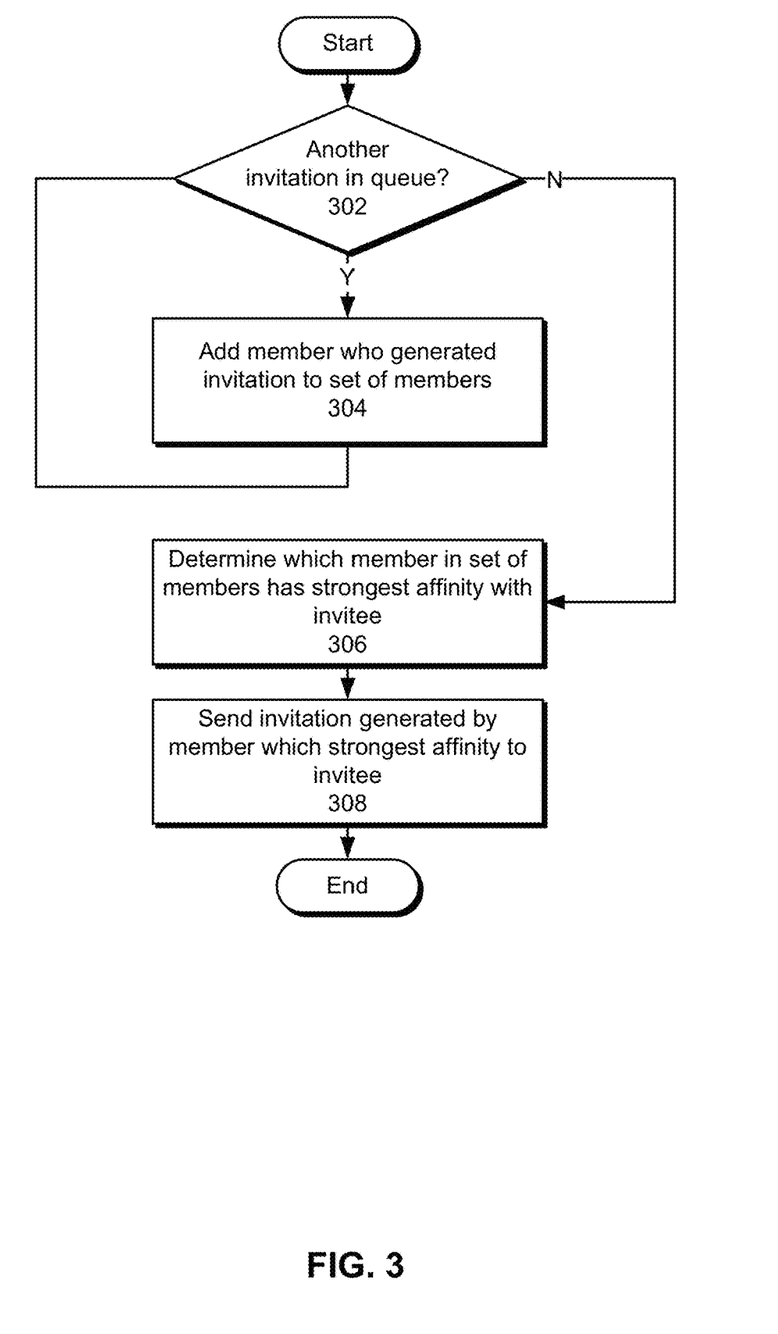
FIG. 3 shows a flowchart illustrating an exemplary process of selecting a queued invitation to send to an invitee in accordance with the disclosed embodiments.

FIG. 3 shows a flowchart illustrating an exemplary process of selecting a queued invitation to send to an invitee in accordance with the disclosed embodiments. In one or more embodiments, one or more of the steps may be omitted, repeated, and/or performed in a different order. Accordingly, the specific arrangement of steps shown in FIG. 3 should not be construed as limiting the scope of the embodiments.

At the expiry of a capping period, if more than one organically generated invitation is queued for a particular invitee, the user community may send the invitation generated by the member that has the strongest affinity with the member. For each invitation in the queue (decision 302), the member that generated the invitation is added to a set of members (operation 304). Next, out of the set of members, the member with the strongest affinity is determined (operation 306).

Various criteria may be used to determine which member has the strongest affinity with the invitee. In particular, multiple variables may be used within a prediction model to select the member that the invitee is most likely to accept an invitation from. Variables may include the member's proximity to the non-member (e.g., geographic, social, and/or familial), the number of interactions (e.g., exchanged emails, SMS messages, instant messages, and/or other correspondences) between the member and the invitee, the number of common entries between the invitee's address book and the member's address book (and/or address books of other members connected to the member in the user community), what type of invitation did the member send to the invitee (e.g., SMS, instant message, or email), what time the member sent the invitation to the invitee, and/or which SMS provider was used to deliver the invitation from the member to the invitee. Variables specific to the invitee may include the country code associated with the invitee based on the invitee's phone number. Variables specific to the member may include the member's educational background, the age-bracket to which the member belongs, the member's connection density, and member's past invitation trials.

Once the closest member has been determined, the queued invitation that was generated by the member is dequeued and sent to the invitee (operation 308). Sending the invitation generated by the member with the strongest affinity to the invitee may be advantageous because it may increase the chance that the invitee accepts the invitation. For example, the invitee may be more likely to join the user community if the invitee receives an invitation from a close friend rather than a distant acquaintance.

In some embodiments, batch invitations that combine queued invitations from a plurality of members with strong affinities may be created and sent to the invitee. Receiving a batch invitation containing invitations from multiple close friends may more effectively encourage the invitee to join the user community within a single capping period. In some embodiments, whether the queued invitations are sent together as a batch invitation is determined based on the likelihood of the invitee joining the user community.

Figure 4:
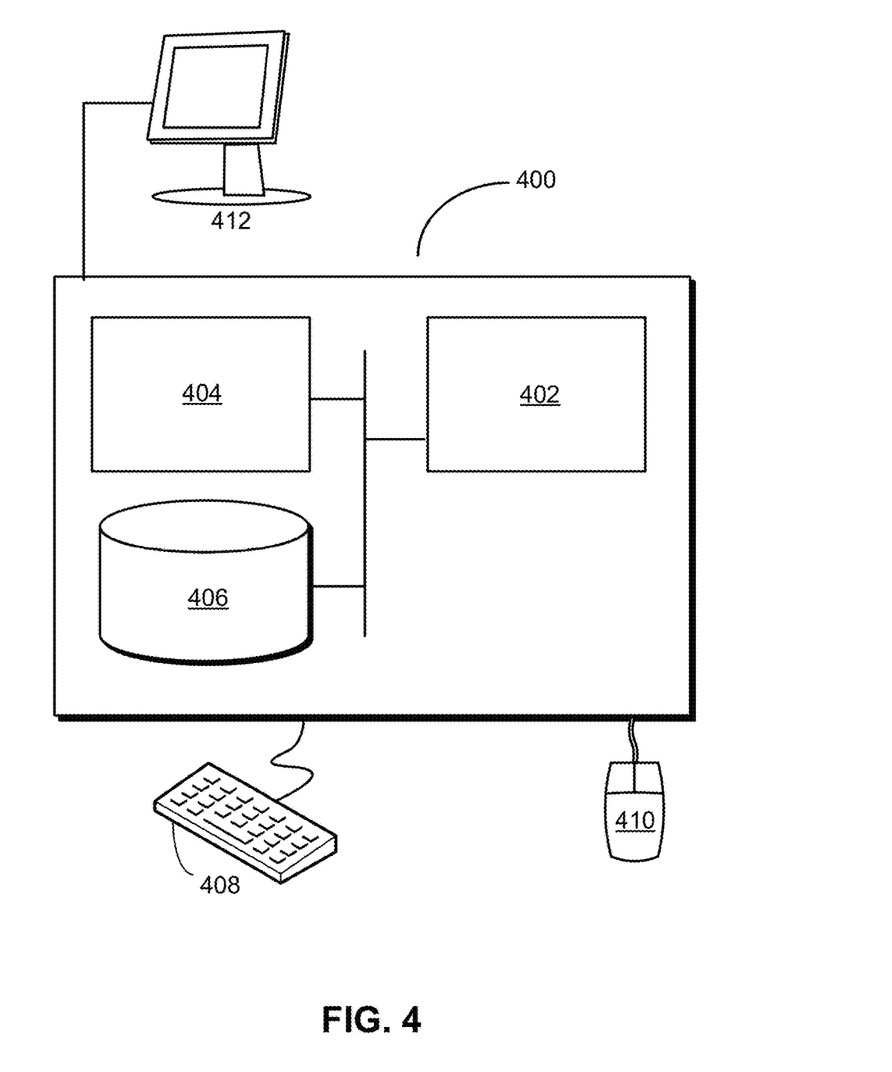
FIG. 4 shows a computer system in accordance with the disclosed embodiments.

FIG. 4 shows a computer system 400 in accordance with an embodiment. Computer system 400 may correspond to an apparatus that includes a processor 402, memory 404, storage 406, and/or other components found in electronic computing devices. Processor 402 may support parallel processing and/or multi-threaded operation with other processors in computer system 400. Computer system 400 may also include input/output (I/O) devices such as a keyboard 408, a mouse 410, and a display 412.

Computer system 400 may include functionality to execute various components of the present embodiments. In particular, computer system 400 may include an operating system (not shown) that coordinates the use of hardware and software resources on computer system 400, as well as one or more applications that perform specialized tasks for the user. To perform tasks for the user, applications may obtain the use of hardware resources on computer system 400 from the operating system, as well as interact with the user through a hardware and/or software framework provided by the operating system.

In one or more embodiments, computer system 400 provides a system for queuing and resending organically generated invitations by members of a user community to facilitate invitation acceptance behavior. The system may include a controller apparatus or module that receives an invitation generated by a member of a user community. The controller apparatus may send the invitation to the invitee. Next, during each of one or more capping periods after the invitation is sent to the invitee, the controller apparatus may queue all invitations organically generated by members of the community and addressed to the invitee. If the invitee is not a member of the user community when the capping period expires, (1) if the queue is not empty, the controller apparatus de-queues and sends at least one queued invitation to the invitee, and (2) if the queue is empty, the controller apparatus resends to the invitee, at least one of the invitations that was previously received by the invitee.

In addition, one or more components of computer system 400 may be remotely located and connected to the other components over a network. Portions of the present embodiments (e.g., application apparatus, controller apparatus, data processing apparatus, etc.) may also be located on different nodes of a distributed system that implements the embodiments. For example, the present embodiments may be implemented using a cloud computing system that manages the profiling of one or a plurality of machines that execute one or more instances of a software application.

By configuring privacy controls or settings as they desire, members of a social network, a professional network, or other user community that may use or interact with embodiments described herein can control or restrict the information that is collected from them, the information that is provided to them, their interactions with such information and with other members, and/or how such information is used. Implementation of these embodiments is not intended to supersede or interfere with the members' privacy settings. In particular, a member of the user community has the option of disabling the automatic sending of invitations on the member's behalf.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method, comprising:
   sending, by computer, a first invitation organically generated by a first member of a user community, to an invitee who is not a member of the user community;
   queuing all invitations organically generated by members of the user community and addressed to the invitee within a first time period after the invitee receives the first invitation;
   when the invitee is not a member of the user community when the first time period expires:
      if the queue is not empty, dequeuing and sending at least one queued invitation to the invitee; and
      if the queue is empty, resending the first invitation to the invitee; and for one or more subsequent time periods after the first time period:
      queuing all invitations organically generated by members of the user community and addressed to the invitee within the subsequent time period.

2. The method of claim 1, wherein sending an invitation to the invitee comprises at least one of:
   sending a Short Message Service (SMS) message to a mobile device associated with the invitee;
   sending an email to the mobile device; and
   sending a message to the mobile device via an instant messaging network.

3. The method of claim 2, wherein dequeuing and sending at least one queued invitation to the invitee comprises:
   if the queue contains a single invitation, dequeuing and sending the invitation to the invitee; and
   if the queue contains a plurality of invitations generated by different members of the user community:
      selecting from the different members a second member that has the strongest affinity with the invitee among the different members; and
      sending to the invitee the invitation that was organically generated by the second member.

4. The method of claim 3, wherein the selection of the second member is based on at least one of:
   a number of emails exchanged between the invitee and the second member;
   a number of SMS messages exchanged between the invitee and the second member;
   a number of contacts the invitee has in common with the second member;
   an educational background of the second member;
   an age bracket to which the second member belongs; and
   a connection density of the second member.

5. The method of claim 2, wherein dequeuing and sending at least one of the queued invitations to the invitee comprises:
   if the queue contains a single invitation, dequeuing and sending the invitation to the invitee; and
   if the queue contains a plurality of invitations generated by different members of the user community, sending a batch invitation that comprises the plurality of invitations.

6. The method of claim 2, further comprising:
   prior to resending the first invitation to the invitee, requesting the first member's consent to resend the first invitation;
   wherein resending the first invitation to the invitee comprises resending the first invitation only if the requested consent is granted.

7. The method of claim 6, wherein requesting the first member's consent comprises displaying a flow of one or more splash pages when the first member logs into the user community.

8. The method of claim 2, wherein:
   sending an invitation to the invitee comprises sending an SMS message to the mobile device; and
   resending the invitation to the invitee comprises sending an email to mobile device.

9. The method of claim 2, wherein the length of each subsequent time period is calculated based on a probability that the invitee will accept the invitation that is sent after the subsequent time period expires.

10. The method of claim 1, further comprising, for the one or more subsequent time periods after the first time period:
    when the invitee is not a member of the user community when the subsequent time period expires:
       if the queue is not empty, dequeuing and sending at least one queued invitation to the invitee; and
       if the queue is empty, resending to the invitee at least one of the invitations that was previously received by the invitee.

11. An apparatus, comprising:
    one or more processors; and memory storing instructions that, when executed by the one or more processors, cause the apparatus to:
- send a first invitation organically generated by a first member of a user community, to an invitee who is not a member of the user community;
- queue all invitations organically generated by members of the user community and addressed to the invitee within a first time period after the invitee receives the first invitation;
- when the invitee is not a member of the user community when the first time period expires:
  - if the queue is not empty, dequeue and send at least one queued invitation to the invitee; and
  - if the queue is empty, resend the first invitation to the invitee; and
- for one or more subsequent time periods after the first time period:
  - queue all invitations organically generated by members of the user community and addressed to the invitee within the subsequent time period.

12. The apparatus of claim 11, wherein sending an invitation to the invitee comprises at least one of:
- sending a Short Message Service (SMS) message to a mobile device associated with the invitee;
- sending an email to the mobile device; and
- sending a message to the mobile device via an instant messaging network.

13. The apparatus of claim 12, wherein dequeuing and sending at least one queued invitation to the invitee comprises:
- if the queue contains a single invitation, dequeuing and sending the invitation to the invitee; and
- if the queue contains a plurality of invitations generated by different members of the user community:
  - selecting from the different members a second member that has the strongest affinity with the invitee among the different members; and
  - sending to the invitee the invitation that was organically generated by the second member.

14. The apparatus of claim 13, wherein the selection of the second member is based on at least one of:
- a number of emails exchanged between the invitee and the second member;
- a number of SMS messages exchanged between the invitee and the second member;
- a number of contacts the invitee has in common with the second member;
- an educational background of the second member;
- an age bracket to which the second member belongs; and
- a connection density of the second member.

15. The apparatus of claim 12, wherein dequeuing and sending at least one of the queued invitations to the invitee comprises:
- if the queue contains a single invitation, dequeuing and sending the invitation to the invitee; and
- if the queue contains a plurality of invitations generated by different members of the user community, sending a batch invitation that comprises the plurality of invitations.

16. The apparatus of claim 12, wherein the memory further stores instructions that, when executed by the one or more processors, cause the apparatus to:
- prior to resending the first invitation to the invitee, request the first member's consent to resend the first invitation;
- wherein resending the first invitation to the invitee comprises resending the first invitation only if the requested consent is granted.

17. The apparatus of claim 16, wherein requesting the first member's consent comprises displaying a flow of one or more splash pages when the first member logs into the user community.

18. The apparatus of claim 12, wherein:
- sending an invitation to the invitee comprises sending an SMS message to the mobile device; and
- resending the invitation to the invitee comprises sending an email to mobile device.

19. The apparatus of claim 12, wherein the length of each subsequent time period is calculated based on a probability that the invitee will accept the invitation that is sent after the subsequent time period expires.

20. The apparatus of claim 11, wherein the memory further stores instructions that, when executed by the one or more processors, cause the apparatus to, for the one or more subsequent time periods after the first time period:
- when the invitee is not a member of the user community when the subsequent time period expires:
  - if the queue is not empty, dequeue and send at least one queued invitation to the invitee; and
  - if the queue is empty, resend to the invitee at least one of the invitations that was previously received by the invitee.

21. A system, comprising:
- one or more processors; and
- a controller module comprising a non-transitory computer-readable medium storing instructions that, when executed, cause the system to:
  - send a first invitation organically generated by a first member of a user community, to an invitee who is not a member of the user community;
  - queue all invitations organically generated by members of the user community and addressed to the invitee within a first time period after the invitee receives the first invitation;
  - when the invitee is not a member of the user community when the first time period expires:
    - if the queue is not empty, dequeue and send at least one queued invitation to the invitee; and
    - if the queue is empty, resend the first invitation to the invitee; and
  - for one or more subsequent time periods after the first time period:
    - queue all invitations organically generated by members of the user community and addressed to the invitee within the subsequent time period.

22. The system of claim 21, wherein sending an invitation to the invitee comprises at least one of:
- a number of emails exchanged between the invitee and the second member;
- a number of SMS messages exchanged between the invitee and the second member;
- a number of contacts the invitee has in common with the second member;
- an educational background of the second member;
- an age bracket to which the second member belongs; and
- a connection density of the second member.

23. The system of claim 21, wherein the non-transitory computer-readable medium of the controller module further stores instructions that, when executed, cause the system to, for the one or more subsequent time periods after the first time period:
- when the invitee is not a member of the user community when the subsequent time period expires:
  - if the queue is not empty, dequeue and send at least one queued invitation to the invitee; and if the queue is empty, resend to the invitee at least one of the invitations that was previously received by the invitee.

* * * * *